Patented June 3, 1924.

1,496,264

UNITED STATES PATENT OFFICE.

FRANCESCO GIORDANI, OF NAPLES, ITALY, ASSIGNOR TO POMILIO BROTHERS CORPORATION, OF NEW YORK, N. Y., A CORPORATION OF NEW YORK.

TREATMENT OF LEUCITE ROCKS.

No Drawing.  Application filed August 25, 1922. Serial No. 584,396.

*To all whom it may concern:*

Be it known that I, FRANCESCO GIORDANI, a subject of the King of Italy, residing at Naples, in the Province of Naples and Kingdom of Italy, have invented certain new and useful Improvements in the Treatment of Leucite Rocks, of which the following is a specification.

The processes of treatment until now proposed for the leucitic and similar rocks, have aimed principally to the separation of potash, considering the residual constituents, especially the alumina, as by-products of limited value; this was due to the fact that following the processes known until today the alumina is obtained impure with silica and iron, and consequently cannot be considered, at the most, as anything better than a very rich bauxite.

Such being the situation the economic success of these processes rests solely on the value of the potassium salts obtained from them.

Conditions though change very markedly, when in these processes use is made of a method of manufacture which enables us to obtain besides the potassium salts, also the alumina to be utilized directly, that is in such a state of purity as to be used, without further preliminary operation, in those industrial applications, as the preparation of the aluminum in the electric furnace, the salts used as mordants, etc., in which the alumina impure with silica and iron could not find any use.

The result desired from the preparation of the alumina in the pure state, that is having that grade of purity required by its technical applications, can be obtained in different ways, of which one will be described here as an instance.

We start with the leucitic rocks conveniently enriched through the usual magnetic and hydraulic processes, which, as it is known, enable us to separate rich material constituted of 90% to 95% of leucite nearly pure, containing small quantities of iron (2 to 3%).

From this rich material, reduced to a proper state of division, the potassium is obtained in the state of potassium chloride, by attacking the material with hydrochloric acid. But, proceeding in the usual way and without particular precautions, the result is that the residual alumina is impure because of the presence of iron and silica.

According to the present invention we obviate this inconvenience by taking care to determine the concentration of the acid used in the attack, as well as the state of division of the material treated so as to obtain the maximum quantity possible of aluminum and potassium in solution and on the contrary the minimum quantity of silica.

To this aim it is advisable to operate with a quantity of acid slightly in default with respect to that technically calculated.

It is to be noted that, for the purpose of obtaining solutions rather concentrated, which is of remarkable practical advantage, it is the practice to begin by using a dilute solution containing but little acid with respect to the total quantity required and then, as the first is consumed through the proceeding of the reaction, the residual quantity is added in the form of the absolute acid.

The observation of these prescriptions is also useful to the end of obtaining the minimum quantity of silica in the soluble state.

The product of the reaction is filtered hot, by which process the silica which is nearly pure remains on the filter and a solution of chloride of potassium and aluminum and, in less quantity, of iron passes through the filter.

This solution is neutralized with an alkali for which it is convenient to use a solution of KOH when we aim particularly to the preparation of potassium chloride in a pure state, and the solution thus neutralized is allowed to settle: thus all of the silica which had remained in solution is separated.

The clarified liquid is then filtered or decanted, and subsequently evaporated it being concentrated in proper manner to crystallize the salts diluted in it with the exception of the iron chloride, which being more soluble makes possible this separation through fractional crystallization.

The raw salt crystallized is left in low tanks to the spontaneous and slow action of the air, so that the water absorbed by it because of its hygroscopic property may produce the gradual hydrolysis of the aluminum chloride.

After a certain time the aluminum chloride is transformed into hydroxide and can be filtered. By this method we obtain alumina of more than 99% purity suitable to be directly used in the usual methods of manufacture of the metallic aluminum. The liquid filtered from the preceding crystallization is dried and the raw salt is treated with the same spontaneous process of hydrolysis above described, by which we obtain an alumina with 60% and more of purity which can be considered as a very rich bauxite and be used as such.

The liquids after the two processes of hydrolysis described contain almost exclusively potassium chloride with small traces of sodium and calcium chlorides, and consequently are treated with the usual technical processes in order to crystallize in a pure state the potassium chloride contained in them.

The processes constituting the treatment illustrated in the preceding description, with particular reference to the case of the attack of the rocks with hydrochloric acid, can also be applied to the case in which other acids are used for the attack of the rock, the only limitation deriving from the fact that the process of spontaneous hydrolysis is not of general application.

What I claim is:—

1. Treatment of the leucitic rocks for the utilization of their constituent elements, marked by the feature that the attack of the leucite is done with a quantity of acid slightly in default with respect to that technically calculated in correspondence to the potassium and aluminum contained, so to reduce to the minimum the diluted quantity of foreign elements.

2. A special process of treatment of leucitic rocks to eliminate the silica which passes into solution with acid attack, consisting in neutralizing the liquid and allowing it to settle, so that the silica may be deposited.

3. As a step in the process of separating aluminum from leucitic rocks, fractional crystallization of a mixture of chlorides to separate the potassium and aluminum chlorides from the more soluble iron chloride, substantially as set forth.

4. A process of treatment of leucitic rocks to recover their constituent elements comprising attacking the rocky material with acid in a dilute form, adding absolute acid as required, and limiting the total acid to a quantity less than that theoretically corresponding to the potassium and aluminum content of said material, substantially as set forth.

5. A process of treatment of leucitic rocks to recover their constituent elements comprising attacking the rocky material with hydrochloric acid and subjecting the mixture of potassium, aluminum and iron chlorides to spontaneous hydrolysis, substantially as set forth.

6. A process of treatment of leucitic rocks to recover their constituent elements comprising attacking the rocky material with acid, removing the silica from the solution, subjecting the residue to fractional crystallization to separate the potassium and aluminum chlorides from the iron chloride, filtering, drying the filtrate, and subjecting the dried residue to spontaneous hydrolysis, substantially as set forth.

In witness whereof, I have hereunto set my hand and seal at Naples, Italy.

FRANCESCO GIORDANI. [L. S.]

Witnesses:
GIAMBATTI DIAGHETTO,
NICOLO GUORINI.